United States Patent [19]
Frick

[11] 3,710,776
[45] Jan. 16, 1973

[54] WINDOWED OVEN DOOR
[75] Inventor: Harold L. Frick, Marion, Ohio
[73] Assignee: Whirlpool Corporation
[22] Filed: Jan. 20, 1971
[21] Appl. No.: 108,051

[52] U.S. Cl..................................................126/200
[51] Int. Cl..............................................F23m 7/00
[58] Field of Search......................................126/200

[56] References Cited

UNITED STATES PATENTS

| | | | |
|---|---|---|---|
| 3,500,815 | 3/1970 | Weese et al. | 126/200 |
| 1,604,811 | 10/1926 | Curry et al. | 126/200 |
| 3,192,575 | 7/1965 | Rosehau et al. | 126/200 |
| 3,362,396 | 1/1968 | Hurko | 126/200 |

*Primary Examiner*—Carroll B. Dority, Jr.
*Attorney*—James S. Nettleton, Thomas E. Turcotte, Burton H. Baker, Gene A. Heth, Franklin C. Harter, Anthony Niewyk, Robert L. Judd and Hofgren, Wegner, Allen, Stellman & McCord

[57] ABSTRACT

A windowed oven door for a high temperature self-cleaning food cooking oven having walls that are heated periodically to a temperature which may reach as high as 950° F. to clean food deposits from the walls by a pyrolysis process in combination with a viewing window for observing the food cooking space within the oven and an air and light permeable protective viewing screen opposite the window for barring contact of the window from the exterior of the oven during both cooking cycles and self-cleaning cycles. The door includes a cooling air passage, and the protective screen has air openings in communication with the cooling air passage.

10 Claims, 5 Drawing Figures

PATENTED JAN 16 1973 3,710,776
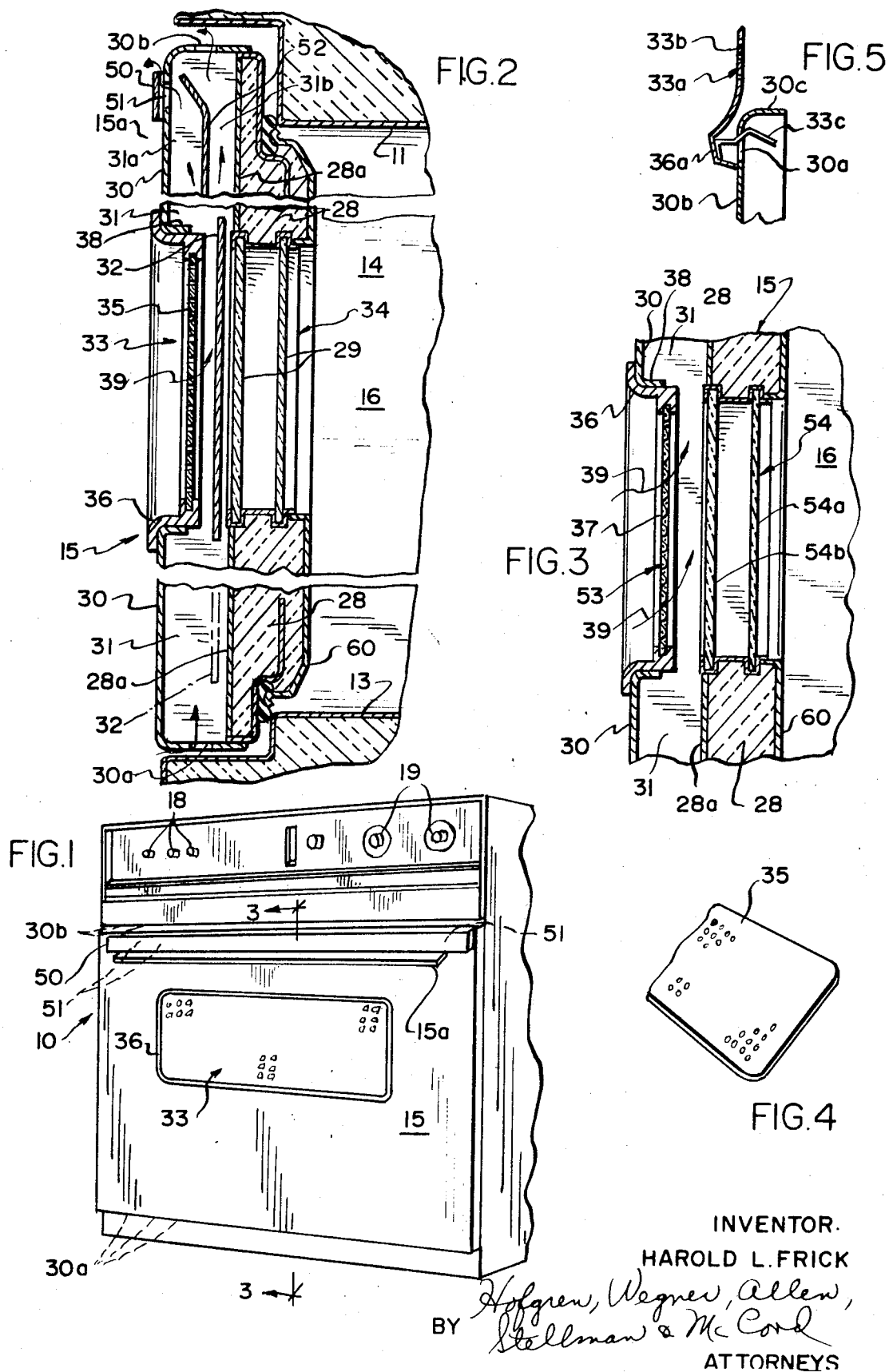
INVENTOR.
HAROLD L. FRICK
BY Holgren, Wegner, Allen, Stellman & McCord
ATTORNEYS

WINDOWED OVEN DOOR

SUMMARY OF THE INVENTION

One of the features of this invention is to provide a protective screen covering the viewing window of the door of a high temperature cooking oven with the door having a cooling air passage therethrough and the screen being capable of passing light rays so that the interior of the oven can be viewed through the screen during the cooking cycles, and cooling air can pass through the screen into the cooling air passage while the screen is still serving as a protector barring contact of the window from the exterior of the oven.

Other features and advantages of the invention will be apparent from the following description of the embodiments shown in the accompanying drawings.

BRIEF DESCRIPTION OF THE DRAWINGS

FIG. 1 is a fragmentary perspective view showing a high temperature food cooking oven embodying the invention.

FIG. 2 is a sectional view taken substantially along line 2—2 of FIG. 1.

FIG. 3 is a sectional view similar to FIG. 2 showing another embodiment of the invention.

FIG. 4 is a detail fragmentary perspective view of a perforated metal plate embodiment of the protective screen.

FIG. 5 is a fragmentary sectional view of a further embodiment of the invention.

DESCRIPTION OF THE PREFERRED EMBODIMENTS

In the embodiment of the invention illustrated in FIGS. 1 and 2 the high temperature self-cleaning oven 10, shown in the form of a built-in oven, comprises a box-like oven liner having heat insulated walls including a top wall 11, a rear wall (not shown), a bottom wall 13 and side walls 14, the walls defining an oven cavity and together with the front opening access door 15 defining a food cooking space 16. The oven door 15 is hinged to the oven 10 along the bottom edge of the door by means of hinge elements (not shown) and is provided with a stationary door handle 15a.

The oven 10 is provided with heating means (not shown) which are employed for cooking, and for raising the temperature of the oven to a high temperature self-cleaning level, on the order of 750°–950° F. with appropriate setting of the oven controls 18 and 19.

The front wall of the oven space 16 is defined by the insulated door 15 which in the embodiment illustrated comprises an insulated section 28 provided with a two pane 29 window or window assembly 34 for viewing the cooking space 16 with these panes being made of the customary heat resistant transparent glass.

The door 15 includes an inner door panel 60, and an outer door panel 30 spaced forwardly of an inner wall 28a of the insulated section 28 to provide a cooling air passage 31. The panels 30 and 60 have substantially aligned registering window openings formed in them to receive the viewing screen 33 described below, and the window assembly 34, respectively. The door 15 also includes means forming air inlet means communicating with air passage 31 comprising a series of elongated slot-like openings 30a formed along the lower inturned edge of panel 30, and means forming air outlet means communicating with air passage 31 comprising a series of elongated slot-like openings 30b formed along an inturned upper member of door 15. In the passage 31 there is also located a customary vertically movable impervious shutter 32 which is arranged in the solid line position of FIG. 2 during the pyrolysis of food deposits during the high temperature self-cleaning cycle but is lowered into the dotted line position also shown in FIG. 2 during the cooking cycles so as to permit the viewing of the cooking space 16. Such shutters and their operating apparatus are well known in this art. In the embodiment illustrated in FIGS. 1 and 2 the shutter 32 in its elevated position illustrated in solid line in FIG. 2 effectively blocks the radiant energy released in the food cooking space 16 from passing out through the screen 33 described below, and also effectively blocks the flow of cooling air against the viewing window 34 during the high temperature self-cleaning cycle.

The outer or front door panel 30 of the door 15 in the illustrated embodiment is provided with an air permeable protective viewing screen 33 in substantial alignment with, and adjacent the viewing window 34. This screen 33 is open enough so that the interior or food cooking space 16 can be viewed through the screen 33 and the panes 29. This screen may be of a perforated metal plate 35 as shown in FIGS. 2 and 4 or may be of woven wire as illustrated in FIG. 3. In order to permit viewing the interior of the oven the screen contains air permeable openings over about 35 to 70 percent of its surface area. The percentage of the screen surface area which consists of such openings is determined by the degree of visibility which is desired, the amount of air permeability through the screen which is desired, the heat reflective properties of the screen, and the aesthetic and economic factors relating to the screen design. Thus in each of the preferred embodiments of FIGS. 2 and 3 the openings amounted to about 50 percent of the surface area and in the embodiment of FIGS. 2 and 4 these openings were in the form of closely adjacent holes of 0.075 inch diameter on 0.10 inch centers, with 112 holes per square inch.

The screen 33 is removably mounted in the door and in the embodiment illustrated in FIG. 2 includes a frame 36 in which the permeable screen portion 37 is mounted. This frame is releasably held as by being press fitted in an opening means in the door which comprises an inturned flange 38 in the illustrated embodiment whose outer surface closely engages the outer surface of the frame 36 as illustrated in FIG. 2. Thus the engagement of the frame with the door panel 30 is a frictional fit.

As shown in FIG. 2, the screen 37 itself being air permeable permits air to3be drawn in through the screen as indicated by the arrows 39 and to pass upwardly by convection in the space 31 from the top of which the resulting heated air is vented to the exterior through air outlets formed in upper portions of the door 15.

The door 15 is provided on an upper portion thereof with a horizontally extending air deflector baffle 50 which is spaced outwardly from outer door panel 30 as shown in FIGS. 1 and 2. In the illustrated embodiment air deflector baffle 50 is imperforate, however, this is a matter of choice and baffle 50 could be perforated if desired.

Behind air deflector baffle 50 the outer door panel 30 is provided with means forming cooling air outlet openings comprising a horizontally extending series of slots 51 which communicate with cooling air passage 31.

The door 15 also includes an inner wall member 52 substantially disposed in cooling air passage 31 in an upper portion of the door behind panel 30. Thus air venting from the cooling air passage 31 exits from door 15 through air outlet 30b via a passageway 31b defined by the inside of inner wall member 52 and inner wall 28a of insulated section 28, and cooling air exits from behind the top edge of baffle 50 via a passageway 31a defined by the outside of the inner wall member 52 and the inside of panel 30.

Referring now to FIG. 3, the windowed oven door structure shown therein in certain respects corresponds with the embodiment illustrated in FIG. 2 and like reference numerals have been utilized where appropriate. In FIG. 3 the protective screen 53 is of woven wire in contrast to the perforated metal plate of the FIG. 2 embodiment.

The viewing window 54 of the FIG. 3 embodiment comprises a two pane window assembly having an inner pane 54a of heat resistant glass adjacent the cooking space, and an outer pane 54b spaced outwardly away from the inner pane 54a, the outer pane 54b having a reflective non-continuous metal coating applied to its outer surface. This coating is reflective, for example, of platinum and the pattern or design is such that there is satisfactory confinement of the heat energy within the oven during the high temperature heat cleaning cycle with enough visibility through it for the housewife to view the interior at all times. The windowed oven door assembly shown in FIG. 3 can thus be utilized to provide an oven door with the equivalent of a shutter or shield in the form of the described non-continuous metallic coating applied to a surface of one of the panes in the viewing window assembly.

Another version of the viewing screen is illustrated in FIG. 5 in which the screen 33a comprises a one-piece dish-like metal stamping in which a raised frame 36a is formed around the periphery of the screen and is integral with the flat central portion of the screen 33b which is a perforated metal plate provided with air openings similar to the structures of FIGS. 2 and 4. The screen 33a may be provided with a plurality of clip fasteners 33c (only one of which is shown) for fastening the screen 33a to the outer door panel 30b. The fasteners 33c are attached to the screen at spaced locations around the periphery of the screen, and are received in openings 30a (only one of which is shown) provided at spaced locations around the door panel window opening 30c which are aligned with the clip fasteners on corresponding portions of the screen.

Although the embodiments of the invention described above are adapted for use in high temperature self-cleaning ovens, it will be understood that the invention may also find utility in windowed oven doors other than those used in high temperature self-cleaning ovens by substituting a pane of conventional transparent heat resistant glass for the reflective pane 54a described above in connection with FIG. 3. Thus, a windowed oven door can be provided with includes a multiple pane viewing window assembly in conjunction with a screen member in the door which may be removably mounted, and with air openings through the screen in communication with a cooling air passage through the door thus to provide a relatively cool door construction wherein the screen member may be readily removed as for cleaning the viewing window.

As can be seen from the above description the protective device 33 prevents direct contact with the window 34 from the exterior of the oven. As can be realized this window even when constructed of spaced panes 29 of heat resistant glass can become quite hot especially during the high temperature pyrolysis process of the self-cleaning cycle where the walls of the oven become quite hot.

In the preferred construction the protective screen device 33 is easily removable as for cleaning the inner surface of the outermost pane 29. The screen proper 37 being air permeable also provides effective air cooling of the interior of the door 15 so that even during the self-cleaning cycles the outer panel 30 of the door is maintained relatively cool.

Having described by invention as related to the embodiments shown in the accompanying drawings, it is my intention that the invention be not limited by any of the details of description, unless otherwise specified, but rather be construed broadly within its spirit and scope as set out in the appended claims.

The embodiments of the invention in which an exclusive property of privilege is claimed are defined as follows:

1. An oven door for a high temperature oven comprising: an outer door panel; an inner wall in said door spaced inwardly from said outer door panel, said outer door panel and said inner wall jointly defining a through opening and a cooling air passage extending vertically through said door; means at the bottom of said passage forming air inlet means in said door; means at the top of said passage forming air outlet means in said door; a viewing window across the rear of said through opening in said door for viewing the interior of the oven and its contents during cooking cycles in said oven; and an air and light permeable protective screen means in said door across the front of said through opening spaced outwardly of the exterior of said window for barring contact of said window from the exterior of the oven during operation of the oven and for viewing the interior of the oven during cooking cycles, said screen having air openings therethrough in communication with said air passage for entry of cooling air into said air passage at a plurality of different positions and including a position in the upper portion of said through opening and defining the outermost element in front of said windows, said door defining an opening means and further including a frame means for removably mounting said screen in said opening means, said frame and screen being retained in said opening means by a frictional engagement of the frame with the opening means, said opening means comprising a surface portion of said door having a frame engaging surface that snugly engages the outer surface of said frame when the frame is in position in the door.

2. The oven door of claim 1 wherein said screen comprises a woven metal cloth.

3. The oven door of claim 1 wherein said screen comprises a perforate metal sheet.

4. An oven door for a high temperature oven comprising: an outer door panel; an inner wall in said door spaced inwardly from said outer door panel, said outer door panel and said inner wall jointly defining a through opening and a cooling air passage extending vertically through said door; means at the bottom of said passage forming air inlet means in said door; means at the top of said passage forming air outlet means in said door; a viewing window across the rear of said through opening in said door for viewing the interior of the oven and its contents during cooking cycles in said oven; and an air and light permeable protective screen means in said door across the front of said through opening spaced outwardly of the exterior of said window for barring contact of said window from the exterior of the oven during operation of the oven and for viewing the interior of the oven during cooking cycles, said screen having air openings therethrough in communication with said air passage for entry of cooling air into said air passage at a plurality of different positions and including a position in the upper portion of said through opening and defining the outermost element in front of said window, said screen having air permeable openings over a substantial portion of the total screen surface thereby permitting viewing of the window through the screen and providing an abundance of air openings for passage of cooling air to the interior of the door in the vicinity of said window, the air outlet means being provided at a higher elevation than said screen for permitting escape of heated air that is drawn into the door through the screen and that has become heated by contact with the door including said viewing window, said door further including means for removably mounting said screen therein comprising a frame carrying said screen and releasably holding said screen in an opening means in the door, said frame and screen being retained in said opening means by a frictional engagement of the frame with the opening means, said opening means comprising a surface portion of said door having a frame engaging surface that snugly engages the outer surface of said frame when the frame is in position in the door.

5. An oven door for a high temperature oven comprising: an outer door panel; an inner wall in said door spaced inwardly from said outer door panel, said outer door panel and said inner wall defining a cooling air passage extending through said door; means forming air inlet means in said door communicating with said cooling air passage; means forming air outlet means in said door communicating with said air passage; a viewing window in said door for viewing the interior of the oven and its contents during cooking cycles in said oven; and an air permeable protective screen means in said door opposite the exterior of said window for barring contact of said window from the exterior of the oven during high temperature operation of the oven and for viewing the interior of the oven during cooking cycles, said screen having air openings in communication with said air passage for entry of cooling air into said air passage, said door being provided with a baffle on an upper portion thereof spaced outwardly from said outer door panel, and said outer door panel including means forming cooling air outlet openings located behind said baffle and communicating with the cooling air passage in said door, said door having an inner wall member disposed in the cooling air passage in an upper portion of the door behind said outer door panel, and cooling air exits from the air outlet means via a passageway defined by the inside of the inner wall member and cooling air exits from behind the top edge of said baffle via a passageway defined by the outside of the inner wall member, said air outlet means being disposed on a top portion of the door.

6. An oven door for a high temperature oven comprising: an outer door panel; an inner wall in said door spaced inwardly from said outer door panel, said outer door panel and said inner wall defining a cooling air passage extending through said door; means forming air inlet means in said door communicating with said cooling air passage; means forming air outlet means in said door communicating with said air passage; a viewing window in said door for viewing the interior of the oven and its contents during cooking cycles in said oven; an air permeable protective screen means in said door opposite the exterior of said window for barring contact of said window from the exterior of the oven during high temperature operation of the oven and for viewing the interior of the oven during cooking cycles, said screen having air openings in communication with said air passage for entry of cooling air into said air passage; and a shutter in said door which is movable to an elevated position between the viewing window and the screen means during self-cleaning cycles, the shutter in said elevated position effectively blocking the flow of cooling air against the viewing window during the self-cleaning cycle.

7. An oven door for a high temperature oven comprising: an outer door panel; an inner wall in said door spaced inwardly from said outer door panel, said outer door panel and said inner wall defining a cooling air passage extending through said door; means forming air inlet means in said door communicating with said cooling air passage; means forming air outlet means in said door communicating with said air passage; a viewing window in said door for viewing the interior of the oven and its contents during cooking cycles in said oven; and an air permeable protective screen means in said door opposite the exterior of said window for barring contact of said window from the exterior of the oven during high temperature operation of the oven and for viewing the interior of the oven during cooking cycles, said screen having air openings in communication with said air passage for entry of cooling air into said air passage, said viewing window comprising a two pane window assembly having an inner pane adjacent the cooking space, and an outer pane spaced outwardly away from the inner pane, the outer pane having a reflective non-continuous metal coating applied to its outer surface.

8. An oven door construction comprising: means defining a door having a through opening; transparent window means closing said opening while permitting viewing therethrough; air and light permeable barrier means across said opening forwardly of said window means and permitting viewing therethrough; means for conducting cooling air through said barrier means and upwardly between said window means and said barrier means for cooling each of said window and barrier means; impervious shutter means; and means for selectively disposing said shutter means between said barrier means and said window means to minimize radiant energy flow through said window means to said barrier means and permit said cooling air to flow through said barrier means at a plurality of different positions including a position in the upper portion of said through opening and upwardly between said barrier means and shutter means to remove heat energy from said shutter means and thereby effectively minimize the heating of said barrier means by heat flow forwardly through said window means.

9. The oven door construction of claim 8, wherein said shutter means is spaced forwardly of said window means and rearwardly of said barrier means.

10. The oven door construction of claim 8 wherein each of said window means, barrier means, and shutter means has approximately the same effective area transversely across the door opening.

* * * * *